Aug. 5, 1958  R. C. BIRD, JR  2,845,912
INDUCTION SYSTEM
Filed Sept. 6, 1957
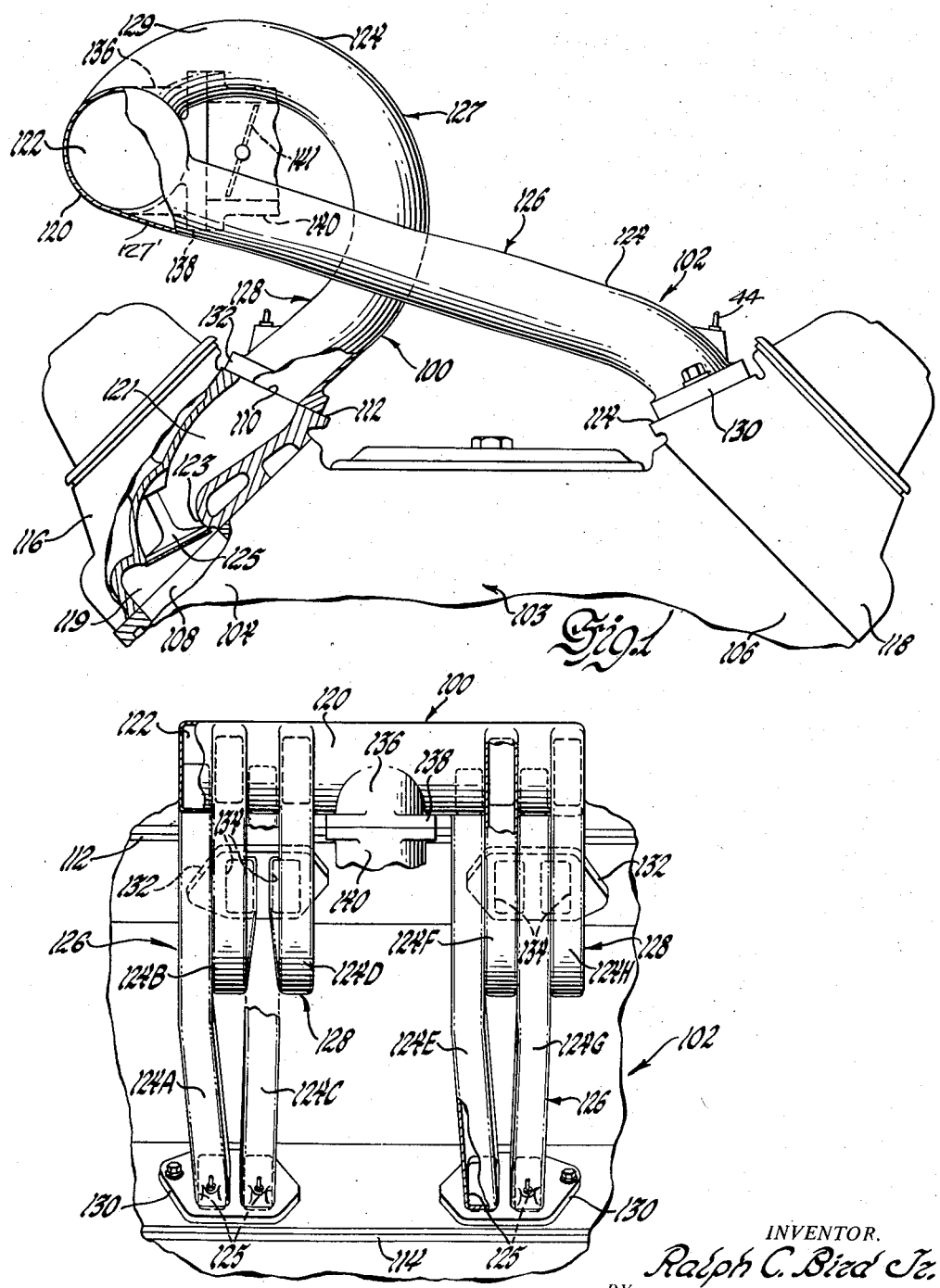
INVENTOR.
Ralph C. Bird Jr.
BY
L. D. Burch
ATTORNEY.

United States Patent Office

2,845,912
Patented Aug. 5, 1958

2,845,912

INDUCTION SYSTEM

Ralph C. Bird, Jr., Lansing, Mich., assignor to General Motors Corporation, Detroit, Mich., a corporation of Delaware Application September 6, 1957, Serial No. 682,340

4 Claims. (Cl. 123—52)

The present invention relates to charge forming means for an internal combustion engine and, more particularly, to an induction system and intake manifold for such an engine that will insure a high volumetric efficiency in the charging of the engine cylinders.

To obtain the maximum performance and economy from an internal combustion engine of the multicylinder type, it is essential that the charges for all of the cylinders be substantially identical in all respects. In addition, the volume of the individual charges should be as large as possible. In the past, numerous attempts have been made to accomplish this objective by providing induction systems having intake manifolds wherein the induction passages are arranged in various configurations to facilitate the charging of the cylinders. Although the foregoing manifolds have produced acceptable results, the various induction passages present resistances to the flow of the charges therethrough. These resistances have materially limited the power developed by the engine. In order to overcome this resistance intake manifolds have been designed wherein the induction passages are "tuned" to have a length suitable for producing a ram effect during the charging cycle. In an engine such as employed in an automotive passenger car, in the range where maximum torque is desired, the engine speed is comparatively low and as a result the ram pipes must have a considerable length in order to produce the ramming effect in the desired range.

It is now proposed to provide an induction system and charge forming means for an internal combustion engine having an intake manifold in which the various induction passages have a length suitable for producing a ram effect even though the speed of the engine is comparatively low. This is accomplished by providing a plenum chamber having throttled air therein and a separate ram pipe interconnecting each cylinder with the plenum chamber. The plenum chamber may be disposed longitudinally along one side of the engine with the ram pipes spiraling downwardly therefrom so as to communicate with the intake passages. In this embodiment, the air meter and throttling mechanism are nested between the ram pipes so as to project transversely across the engine towards the opposite side thereof.

In the drawings:

Figure 1 is a fragmentary end view of an engine employing an induction system having a different embodiment of the present invention therein.

Figure 2 is a plan view of the manifold employed in the induction system of Figure 1.

Referring to the drawings in more detail, the present invention may be adapted to be employed in an intake manifold 100 for use on an internal combustion engine 102 of any suitable design. However, in the present instance it is particularly adapted for use on an internal combustion engine 102 of the so-called V-type. This engine 102 includes a cylinder block 103 having a pair of angularly disposed banks 104 and 106 of cylinders 108 with an upwardly opening space therebetween. A separate cylinder 116 and 118 is secured to each of these banks 104, 106 so that inclined plane faces 112, 114 on the sides thereof extend longitudinally along the opposite sides of the space. Separate cavities in the cylinder heads 116, 118 register with the open ends of the cylinders 108 to thereby form combustion chambers 119. Individual intake passages 121 for each of the cylinders 108 extend through the heads 116, 118 with the inner ends thereof forming intake valve seats 123 communicating with the combustion chambers 119 and the outer ends thereof forming intake ports 110 in the faces 112, 114. Intake valves 125 are disposed in each of these seats 123 and are actuated by the engine camshaft to time the flow of the charges into the cylinders 108.

In order to supply a combustible mixture of air and fuel for the cylinders 108, charge forming means 127 may be disposed above the space between the two banks 104, 106 of cylinders 108. This charge forming means 127 includes an air induction system 129 and a fuel injection system such as disclosed in copending application Serial No. 591,889, filed June 18, 1956 in the name of John Dolza. This system includes means responsive to the fuel demands of the engine and effective to inject the metered fuel from the nozzles 44 and into the charge in proportion thereto.

The induction system 129 includes an intake manifold 100 having a main body 120 and a plurality of ram pipes 124. The main body 120 comprises a substantially cylindrical housing having the opposite ends thereof closed by a pair of flat plates so as to form an airtight plenum chamber 122. An inlet duct 136 extends horizontally outwardly from the center of the body 120 and has a mounting flange 138 on the outer end thereof to receive a throttle body 140. A throttle body 140 having a throttle valve 141 therein may be mounted on this flange 138 to control the flow of air into the plenum chamber 122. In addition, any suitable air metering device such as a venturi may be provided on the throttle body 140 for developing a metering signal for controlling the fuel injection system. It may thus be seen that the body 120 encloses a plenum chamber 122 in which only throttled air is supplied to the center thereof.

The individual ram pipes 124 are designated 124A to 124H, inclusive, depending upon the cylinder which they serve and they may be broken down into two separate groups 126 and 128. One group 126 includes the ram pipes 124A, 124C, 124E and 124G which have the inlet ends 127' thereof secured to the lower side of the body 120 to open into the lower portion of the plenum chamber 122. The ram pipes 124A, 124C, 124E and 124G in the first group 126 are substantially straight and they extend diagonally downward from the plenum chamber 122 so as to terminate in a series of openings 125 in a mounting plate 130. This plate 130 is adapted to be secured to the right face 114 so that the openings 125 will register with the intake ports 110. The ram pipes 124B, 124D, 124F and 124H in the other group 128 spiral upwardly from the top of the plenum chamber 122 so as to terminate in a mounting plate 132 to form a series of openings 134 positioned to register with the intake ports 110.

It may thus be seen that an induction system has been provided in which an intake manifold has a plurality of ram pipes arranged to produce a ramming effect during the charging of the engine cylinders. As a result of their upwardly spiraling and interlacing arrangement, the overall length of the ram pipes may be sufficiently long to produce the ramming effect at even low engine speeds without unduly increasing the height above the engine.

Various changes and modifications of the embodiment of the invention described herein may be made by those skilled in the art without departing from the spirit and principles of the invention.

I claim:

1. Charge forming means for a multicylinder engine having a pair of angularly disposed banks of cylinders, said means comprising an intake manifold having a plenum chamber adapted to be disposed over one of said banks of cylinders to extend longitudinally of said engine, a first group of ram pipes intersecting said chamber to form a row of ports extending longitudinally thereof for interconnecting said chamber with the cylinders in one of said banks, a second group of ram pipes intersecting said chamber to form a second row of ports extending longitudinally thereof and spaced from said first row of ports to interconnect said chamber with the cylinders in the other of said banks, an atmospheric inlet intersecting said chamber so as to have a throttle body mounted thereon.

2. Charge forming means for a multicylinder engine having a pair of angularly disposed banks of cylinders comprising an intake manifold having a plenum chamber adapted to be disposed over one of said banks of cylinders to extend longitudinally of said engine, a first group of ram pipes intersecting the top of said chamber to form a row of ports extending longitudinally along the top thereof, a second group of ram pipes intersecting the side of said chamber to form a second row of ports extending along the side thereof, one of said groups of ram pipes interconnecting said chamber with the cylinders in one of said banks, the other group of ram pipes interconnecting said chamber with the cylinders in the opposite bank, an inlet disposed between said pipes and intersecting said chamber so as to have a throttle body mounted thereon.

3. Charge forming means for a multicylinder engine having a pair of angularly disposed banks of cylinders comprising an intake manifold having a plenum chamber adapted to be disposed over one of said banks of cylinders to extend longitudinally of said engine, a first group of ram pipes extending upwardly from the top of said chamber to interconnect said chamber with the cylinders in the bank immediately below said chamber, a second group of ram pipes interconnecting said chamber with the cylinders in the opposite bank, an inlet disposed between said pipes and intersecting the center of said chamber at substantially right angles thereto.

4. Charge forming means for a multicylinder engine having a pair of angularly disposed banks of cylinders comprising an intake manifold having a plenum chamber adapted to be disposed over one of said banks of cylinders to extend longitudinally of said engine, an inlet projecting substantially horizontally from the center of said chamber towards the opposite cylinder bank so as to have a throttle body mounted thereon, a first set of ram pipes on one end of said chamber and a second set of ram pipes on the other end of said chamber, each of said sets including a pair of ram pipes projecting upwardly from the top of said chamber to communicate with the cylinders in the bank immediately below said chamber and a pair of ram pipes interconnecting said chamber with the cylinders in the opposite bank.

No references cited.

Disclaimer 2,845,912.—*Ralph C. Bird, Jr.*, Lansing, Mich. INDUCTION SYSTEM. Patent dated Aug. 5, 1958. Disclaimer filed May 2, 1966, by the assignee, *General Motors Corporation*.

Hereby enters this disclaimer to claim 1 of said patent.

[*Official Gazette August 23, 1966.*]